United States Patent

[11] 3,618,092

| [72] | Inventor | Douglas K. Waineo<br>Anaheim, Calif. |
|---|---|---|
| [21] | Appl. No. | 827,194 |
| [22] | Filed | May 23, 1969 |
| [45] | Patented | Nov. 2, 1971 |
| [73] | Assignee | North American Rockwell Corporation |

[54] SIGNAL INJECTION APPARATUS FOR AVOIDING MONOPULSE ANOMALIES IN A MONOPULSE ARRAY
13 Claims, 8 Drawing Figs.

[52] U.S. Cl. .................................................. 343/16 M, 343/853
[51] Int. Cl. ................................................... G01s 9/22, H01q 21/00
[50] Field of Search ........................................... 343/16 M, 770, 771, 776, 853

[56] References Cited
UNITED STATES PATENTS

| 2,717,380 | 9/1955 | Brooks, Jr. ............... | 343/16 M |
| 3,255,450 | 6/1966 | Butler ....................... | 343/853 X |
| 3,419,870 | 12/1968 | Wong ........................ | 343/853 X |
| 3,430,247 | 2/1969 | Wong ........................ | 343/771 |
| 3,435,453 | 3/1969 | Howard ..................... | 343/853 X |

Primary Examiner—Malcolm F. Hubler
Attorneys—William R. Lane, L. Lee Humphries and Rolf M. Pitts ABSTRACT: In a monopulse microwave system, means for avoiding monopulse anomalies by the injection of a received microwave sample into the monopulse difference channel, whereby the signal level of the difference channel sidelobe response is maintained above that of the sum channel.

ANGLE–OFF–PHYSICAL–BORESIGHT

INVENTOR.
DOUGLAS K. WAINEO

BY

ATTORNEY

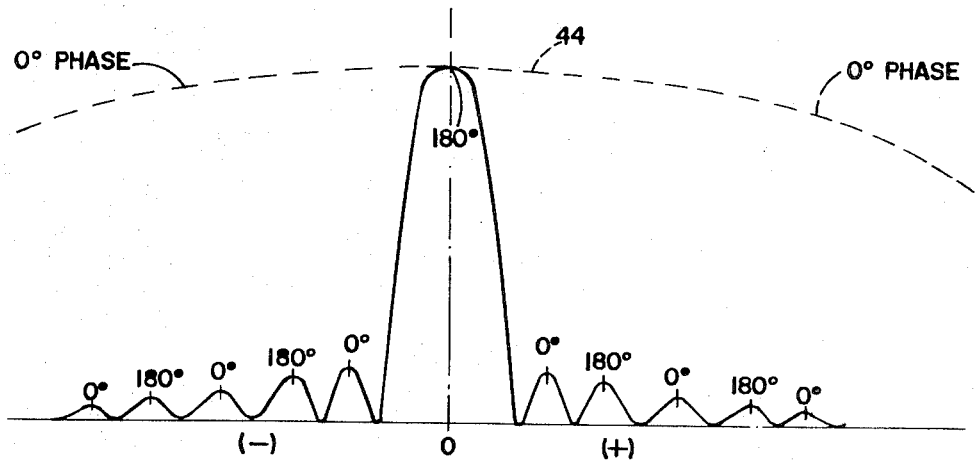
FIG. 5  ANGLE-OFF-ELECTRICAL-BORESIGHT ($\beta$)
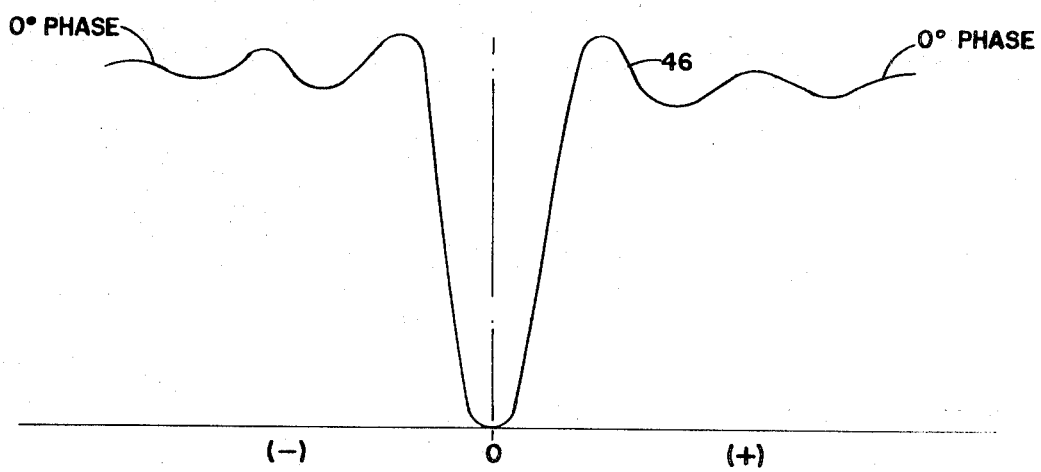
FIG. 6  ANGLE-OFF-ELECTRICAL-BORESIGHT ($\beta$)
INVENTOR.
DOUGLAS K. WAINEO
BY *Roxym Pitts*
ATTORNEY

SIGNAL INJECTION APPARATUS FOR AVOIDING MONOPULSE ANOMALIES IN A MONOPULSE ARRAY

CROSS-REFERENCE TO COPENDING APPLICATIONS

1. U.S. Pat. application Ser. No. 703,381, filed Feb. 6, 1968, by James A. Moulton for Logarithmic Monopulse Receiver.

BACKGROUND OF THE INVENTION

The invention herein described was made in the course of or under a contract or subcontract thereunder, with the United States Navy. Monopulse systems for measuring the target angle or angle-off-boresight of a detected target (situated within the antenna beamwidth) in a given plane containing the antenna boresight axis or a radiation axis of symmetry, employ an antenna having at least two feedhorns or subarray feeds to provide two received signals. Also employed are conventional sum-and-difference monopulse receivers responsive to the sum of and the difference between the two received signals to provide a target angle signal indicative of the angle of a detected target off the antenna boresight axis. The sum signal itself is ordinarily used for target display purposes.

In the design of such monopulse receiver systems, the aperture of a prior art conventional antenna may have a rectangular shape with a uniform field distribution across the aperture. Such rectangular aperture normally has a substantial associated sidelobe pattern or response. Antennas having such antenna sidelobe response or radiation patterns provide illumination of targets lying within such sidelobes; and are, therefore, sensitive to energy reflected from such illuminated targets. Further, such a rectangular aperture normally provides more than a single null in the response of the difference signal as a function of target angle-off-boresight, thereby producing certain anomalies in the determination of the target-off-boresight from such signal. For example, the detection of a target lying within the sidelobe response of an antenna may result in the generation of target angle signals falsely indicating a target angle-off-boresight lying within the angular width of the antenna main lobe response.

Such ambiguities may also occur in a normal antenna with good sidelobe characteristics if the target is very close, or very reflective, or purposely amplifying and retransmitting the radar signal to provide false target indications for jamming.

A discussion of such ambiguities, together with one means of attempting to reduce such ambiguities in the monopulse technique for measuring target angle-off-boresight, is described in U.S. Pat. No. 3,283,322 issued Nov. 1, 1967 to R. E. Hovda et al. for Monopulse Receiver Apparatus. Such means comprises shaping the amplitude distribution or combined aperture field distribution from a conventional rectangular shape to achieve a gabled amplitude distribution. Such gabled amplitude aperture distribution is achieved by physically shaping the frontal area of an antenna reflector or physically shaping of the antenna feedhorn apparatus or correcting the dipole elements of a flat plate monopulse antenna. A second alternative method of reducing the ambiguities in the monopulse difference signal is to provide a preselectively controlled phase distribution across the antenna aperture, as taught and described in U.S. Pat. No. 3,355,738 issued Nov. 28, 1967 to J. A. Algeo for Microwave Antenna Having A Controlled Phase Distribution.

The above-described techniques for controlling the antenna aperture distribution are intended to provide monopulse antenna signals of a form which may be effectively gated or processed by a receiver-processor, to avoid "false-alarms" or the presentation of ambiguous target information to a display indicator. Such receiver-processor is generally required to perform two functions: (1) signal normalization, so as to reduce system sensitivity to changes in range and reflectivity and like factors affecting the strength of the target echoes received by the antenna, as is well understood in the art; and (2) signal-gating to avoid producing a receiver output in response to target conditions not of interest.

A suitable logarithmic amplifier arrangement adapted to cooperate with a suitable monopulse antenna to effect such normalization and monopulse signal gating functions is taught in copending U.S. application, Ser. No. 703,381, filed Feb. 6, 1968 by James A. Moulton, assignor to North American Rockwell Corporation, assignee of the subject invention. However, the effective utilization of such logarithmic amplifier arrangement yet requires a monopulse antenna system of suitable characteristics in which the difference channel sidelobe response level is preferably greater than that of the sum channel.

In summary, the above-described monopulse antenna systems for monopulse gating, or beta gating, applications for avoiding monopulse anomalies are limited to a dish, or reflector, type antenna, distorted from a true parabolic shape and requiring carefully maintained geometrical tolerances. Further, such dish type antennas do not readily lend themselves to a multimode monopulse system applications requiring both selectable beam shapes and the avoidance of monopulse anomalies. Further, such "bent-dish" approach does not readily lend itself to electronic scanning techniques such as phased arrays.

Although preselective shaping of the amplitude and phase distribution of the aperture can also be applied to array type monopulse antennas, such techniques do not readily lend themselves to electronically scanned arrays, such as phased arrays, where accurate aperture phase distribution is extremely difficult. In other words, control of the aperture phase distribution (for improved sidelobe performance) is necessarily sacrificed to selective directivity or directional scanning performance.

Still another beta-gating technique employed to avoid monopulse system response to monopulse anomalies is described in U.S. Pat. No. 3,094,695 issued to D. M. Jahn for Antenna Side Lobe Suppression System, and utilizes an omnidirectional antenna and associated auxiliary receiver having a combined gain less than that of the monopulse sum channel receiver main beam gain and substantially equal to the sidelobe region gain of the monopulse receiver. The outputs of the auxiliary receiver and the monopulse receiver are compared for the gating-off or blanking of the monopulse receiver output in response to the logic combination of a weak monopulse receiver signal relative to the omnidirectional receiver response, indicative of a sidelobe response condition. A disadvantage of such arrangement is the requirement for an additional receiver and associated logic gating equipment. An additional disadvantage is the necessity of maintaining the relative gain calibrations of the receivers against drift in gain performance.

SUMMARY OF THE INVENTION

By means of the concept of the subject invention, a microwave monopulse signal injection technique is employed, whereby the above-noted shortcomings of the prior art may be avoided.

In a preferred embodiment of the invention, there is provided a monopulse receiver antenna system having a sum channel and a difference channel. There is also provided means for reducing monopulse anomalies in a monopulse difference channel of said system and comprising an auxiliary feedhorn and injection means responsive to said auxiliary feedhorn for injection of an auxiliary signal sample into the monopulse difference channel of said system.

In normal operation of the above-described arrangement, the level of the difference channel response to signals in the direction of the antenna sidelobe pattern is maintained well above that of the sum channel sidelobe response, whereby monopulse receiver beta-gating techniques may be effectively employed, even in the presence of substantial amounts of phase error and regardless of the style of monopulse antenna system employed. In other words, such injection technique may be utilized with a single mode reflector antenna, a multiple mode reflector antenna, or with electronically scanned monopulse arrays.

Accordingly, it is an object of the subject invention to provide an improved monopulse antenna system.

Another object of the invention is to provide a monopulse antenna system having reduced monopulse ambiguities.

Still another object of the invention is to utilize a signal injection technique for reducing monopulse anomalies in a monopulse antenna system.

A further object is to provide a monopulse antenna system utilizing auxiliary signal injection to provide a difference channel sidelobe response level higher that that of the sum channel, with adequate margin so as to reduce sensitivity to unavoidable antenna phase errors.

Yet another object is to provide a monopulse antenna system free of monopulse ambiguities and adapted to electronic scanning.

These and further objects of the invention will become apparent from the following description, taken together with the accompanying drawings in which:

BRIEF DESCRIPTION OF THE DRAWINGS

FIG. 5 is an exemplary diagram of the far field patterns for each of the arrays and the auxiliary feed of FIG. 3;

FIG. 6 is a diagram of the injection signal pattern developed from the vector sum of the two patterns of FIG. 5;

In the figures, like reference characters refer to like parts.

DESCRIPTION OF THE PREFERRED EMBODIMENTS

Figure 1:
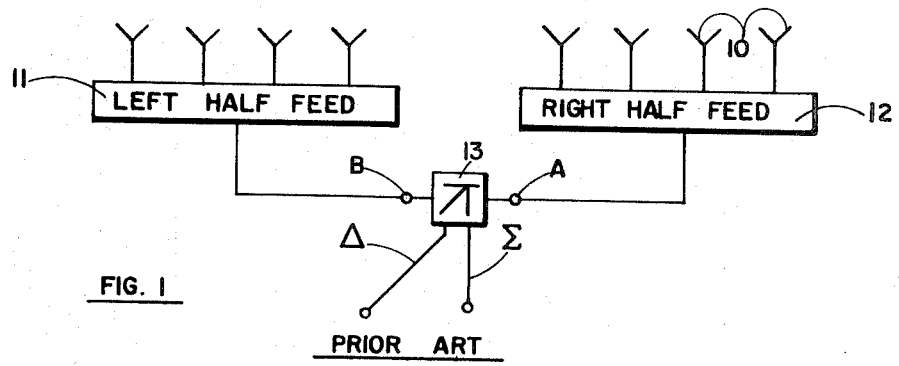
FIG. 1 is a schematic diagram of the prior art antenna array.

Referring now to FIG. 1, there is illustrated a prior-art monopulse array in which the concept of the invention may be advantageously employed. There is provided a plurality of radiating feedhorns 10 comprising a left hand or first subarray and a right-hand or second subarray, as to be oppositely disposed about a physical boresight axis of the composite array. Each subarray is coupled by a respective one of corporate feed means 11 and 12 to a respective input terminal of a magic tee 13 of like monopulse signalling means for providing a first output ($\Sigma$) indicative of the sum of the input on terminals A and B (as shown by curve 14 in FIG. 2) and further providing a second output ($\Delta$) indicative of the difference between the inputs on terminals A and B (as shown by curve 15 in FIG. 2).

The monopulse responses $\Sigma$ and $\Delta$ are plotted as a normalized function of angle-off-boresight in a plane parallel to the plane containing the array of FIG. 1, the main lobe response of the antenna clearly occurring between +10° and +30°, the main lobe axis being at +20°. Such apparent nonzero, or off-boresight condition being indicative of a representative electronic phase scanned condition, as might be effected, for example, by a phase-scanning configuration for corporate feeds 11 and 12. In such a configuration, which is well known per se and forms no part of the inventive concept, electronically controlled phase shifters may be interposed at the coupling of each feedhorn 10 to a respective corporate feed 11 and 12 for varying the directivity or phase-front direction of the phase front either propagated by such an antenna or to which the antenna responds.

Such an electronic phase-scanning configuration, however, nearly always introduces substantial amounts of phase errors. These may be of a systematic and predictable nature, as when the amount of phase shift is "quantized" by the use of digital control. They may also be random in nature, as with unavoidable variations in the properties of the materials and components in the phase shifters. Thus, although the feeds 11 and 12 are usually so designed that the responses of the central elements are weighted more heavily than the outer elements, whereby (in the absence of these phase errors) the difference pattern sidelobe response may nominally remain above the sum sidelobes; yet the monopulse response of the device of FIG. 2 will actually include the unavoidable effects of a typical unpredictable amount of phase error.

The monopulse sum ($\Sigma$) and difference channel ($\Delta$) responses to about the electrical boresight direction of +20° is shown as $|\Sigma|$ and $|\Delta|$, indicating that only the amplitude of such responses is shown, and not the phase sense reversals thereof; nor is the phase sense reversal of the difference ($\Delta$) response across such electrical boresight indicated. It is further noted from FIG. 2 that in the sidelobe regions (i.e., regions outside of the main lobe region of +10° to +30°), monopulse anomalies occur, as indicated by the dip of the difference channel amplitude response ($\Delta$) below that of the sum channel. Such monopulse anomalies in the representative response of the monopulse array of FIG. 1 may be avoided by means of the improved arrangement of FIG. 3.

Figure 3:
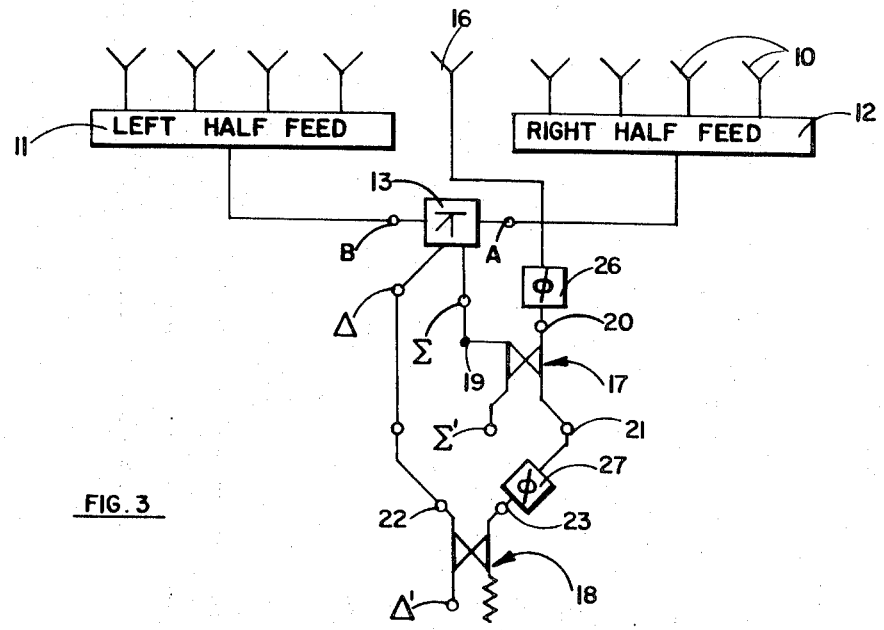
FIG. 3 is a schematic diagram of a monopulse array embodying the signal injection concept of the subject invention.

Referring now to FIG. 3, there is illustrated a monopulse antenna system embodying the concept of the invention. There is provided an array of a plurality of feedhorns 10, corporate feeds 11 and 12 and magic tee 13, similarly constructed and arranged as like referenced elements of FIG. 1. There is also provided an ancillary feedhorn 16 disposed on the physical boresight of the feedhorn array and centrally of the two left and right subarrays for providing an auxiliary feedhorn received energy sample. There is further provided a first and second microwave directional coupler 17 and 18, a first input port 19 of first coupler 17 being coupled to sum output port ($\Sigma$) of magic tee 13 and a second input port 20 of first coupler 17 being coupled in circuit to auxiliary feedhorn 16. First coupler 17 also has a third port comprising a system sum port $\Sigma$ and further has a fourth port 21.

Second directional coupler 18 has a first port 22 coupled to difference output port ($\Delta$) of magic tee 13 and further has a second port 23 coupled to the fourth port 21 of first directional coupler 17. One of the two output ports of coupler 18 comprises a system difference port ($\Delta'$), while the other may be terminated by a terminating impedance.

Where directional couplers 17 and 18 comprise phase-shifting directional couplers, known in the art per se, compensatory phase shift means 26 and 27 may be interposed in circuit between auxiliary feedhorn 16 and second port 20 (of coupler 17) and between fourth port 21 (of coupler 17) and second port 23 (of coupler 18).

Figure 4:
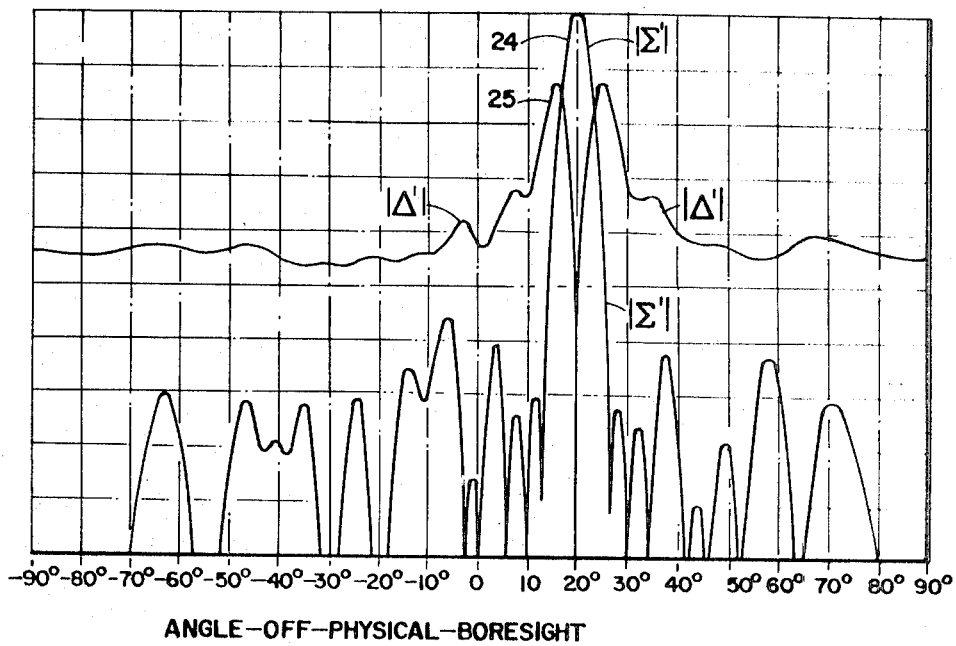
FIG. 4 is an exemplary diagram of a representative monopulse far-field pattern for the invention device of FIG. 3 and illustrating a different channel sidelobe response greater than that of the sum channel.

In normal operation of the above described arrangement, the illustrated cooperation of feed 16 with terminals $\Sigma'$ and $\Delta'$ is to selectively bias the sidelobe response of the monopulse difference ($\Delta$) channel relative to the monopulse sum ($\Sigma$) channel, as to maintain a difference channel ($\Delta'$) sidelobe response level greater than the sum ($\Sigma'$) channel response level, as shown by curves 24 and 25 in FIG. 4.

Figure 2:
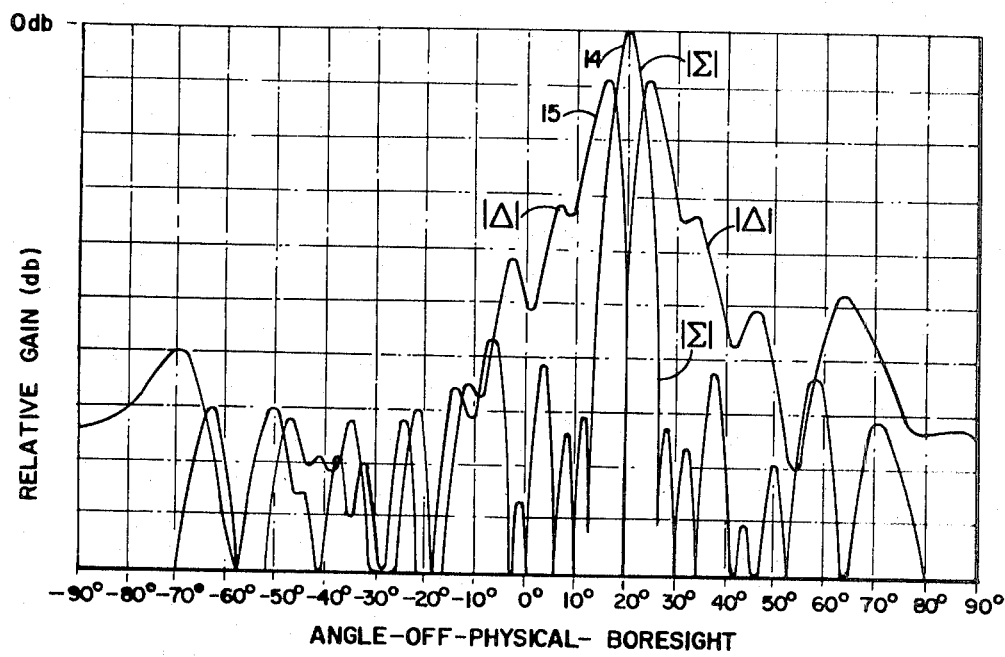
FIG. 2 is an exemplary diagram of a representative monopulse for field pattern for the device of FIG. 1 and illustrating monopulse anomaly conditions.

These curves, like the corresponding curves of FIG. 2, represent the response of the antenna in the presence of typical amounts of phase error introduced by the feeds 11 and 12.

It is to be appreciated that the cooperation of single feed 16 provides a small-aperture, low-power ancillary sum pattern having an associated broadbeam far field pattern as shown by the even-valued function or dotted curve 44 in FIG. 5. The phase of such injection signal source is substantially zero degrees over the lesser beamwidth region of the main array of FIG. 3 and is only little attenuated between terminals 20 and 21 of coupler 17, while being substantially attenuated and quadrature phase shifted between terminals 20 and $\Delta'$ of coupler 18.

Because of the low signal level from source 16 and the further attenuation thereof (normally 10 to 20 db) through coupler 17 to terminal Σ', such signal has little effect upon the sum signal output at terminal Σ' of coupler 17.

Similarly, the sum (Σ) signal output of magic tee 13 suffers attenuation and quadrature phase shift from terminal 19 to terminal 21 of coupler 17. The level of the on-boresight sum (Σ) signal at terminal 21 is preferably adjusted by the design of coupler 17 such that the signal level thereof is equal to the signal level of the on-boresight injection signal source at terminal 21 (i.e., the signal from an on-boresight target), as indicated by curve 45 in FIG. 5, in comparison with curve 44, at the peak of the sum pattern (e.g., $\beta=0$). However, the quadrature phase shift ($+90°$) of such sum signal (through coupler 17) and the compensatory phase lag ($-90°$) of the injection signal source through phase shifter 26 provides an antiphase relationship between such on-boresight signals, as indicated by the zero or reference phase notation for the injection signal (curve 44 in FIG. 5) and the 180° phase notation for the attenuated sum (Σ) signal (curve 45) (near the peak of the sum signal response).

The resultant on-boresight signal state on terminal 21 (in FIG. 3) is a null signal level curve 46 at $\beta=0$ in FIG. 6, the degree of which is a function of the gain-matching of the attenuated sum (Σ) signal to the injection source and the quality of the antiphase relationship therebetween. Thus, the null region of curve 46 is seen to be a broad beamwidth null (comparable to the beamwidth of the main lobe of curve 45 for the principal array of FIG. 3).

In the sidelobe regions of curve 45 (FIG. 5), the peaks of the sidelobes represent alternate in-phase and antiphase conditions, as is well understood in the art, such that the vector combination of the responses of curves 44 and 45 result in the amplitude modulation of curve 44 as a function of $\beta$ and shown as curve 46 in FIG. 6. Curve 46 is thus seen to represent a bias in the sidelobe regions and a broad null in the main lobe region.

The modulated injection signal on terminal 21 of coupler 17 is subjected to a quadrature phase shift through phase shifter 27 and a second quadrature phase lag in the transfer from terminal 23 to terminal Δ' through coupler 18, as to be restored to an in-phase condition, relative to signal source 16. In addition, the injection signal applied to terminal 23 (of coupler 18) is subjected to attenuation in traversing coupler 18 to terminal Γ'.

As is understood in the monopulse microwave bridge art, the nominal on-boresight phase relation of the monopulse difference signal to the sum signal is a quadrature time-phase relation. Thus, the vector sum of the difference (Δ) signal and the injection signal occurring at output terminal Δ' of coupler 18, as a function of $\beta$ (angle-off-boresight), will always be larger than either of its constituents, so the difference (Δ) signal is effectively biased upward by the injection signal as shown by the high sidelobe response of Δ', as shown by curve 25 in FIG. 4.

In other words, the difference (Δ) signal is an odd valued function, which reverses sense or phase with a reversal in the sense of $\beta$, as to yet generally be in a quadrature phase relationship to the sum pattern injection signal. THus, the sensitivity of the resultant difference (Δ') signal in the sidelobe regions is smoothly biased above the sum channel sidelobe peak response. Further, because of the broad null region of the injection signal (curve 46 in FIG. 6), such injection, as applied at terminal 23 (of coupler 18) in FIG. 3, has substantially no effect upon the linearity and null properties of the system monopulse difference channel performance at output terminal Δ' of coupler 18.

Accordingly, an improved monopulse receiving antenna system has been described, having reduced susceptibility to monopulse anomalies.

Although the disclosed antenna system of the invention has been described as a receiving antenna, it is clear from the theorem of reciprocity that such system may be employed for transmission of energy by the application of a source of energy-to-be-transmitted to terminal Σ' of first coupler 17. Also, where the feedhorns 10 and 16 are regularly arrayed to comprise a single common transmitting array, the attenuated and phase shifted excitation of feed 16, relative to the excitation of feeds 10, results in a degree of discrete gain and phase distribution of the effective transmitting aperture, as to improve the resultant far-field illumination pattern relative to that of the pattern obtained from the use of port Σ alone. Moreover, although the device of the invention has been described in terms of a central disposition of the auxiliary feed 16 in cooperation with two directional couplers 17 and 18 (in FIG. 3), the concept of the invention is not so limited, although such embodiment may be preferred. In an alternate arrangement, the ancillary feed need not be centrally disposed relative to the array. Nor need two directional couplers be employed.

Figure 7:
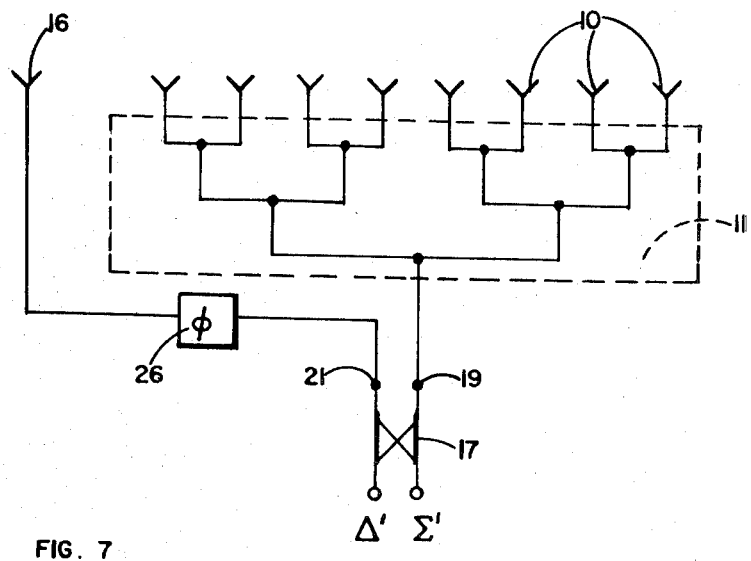
FIG. 7 is a schematic diagram of an alternate embodiment of the inventive concept.

Referring to FIG. 7, there is shown an alternate embodiment of the invention. There is shown an array of elements 10 coupled by composite feed means 11 to terminal 19 of a directional coupler 17. There is also provided an ancillary feed 16 coupled to a second terminal 20 of coupler 17 by phase shift means 26.

In normal operation of the arrangement of FIG. 7, the high signal level from corporate feed 11 is subjected to both an attenuation and a phase shift ($+90°$), in traversing coupler 17 from terminal 19 to output terminal Δ', while the output of feed 16 is phase lagged ($-90°$) by element 26, as to be in an antiphase relation with the phase-shifted and attenuated component of the corporate feed output. Thus, the Δ' output of coupler 17 comprises a difference channel. By adjusting the attenuation of the phase-shifted corporate feed signal through coupler 17 to output terminal Δ', the on-boresight gain thereof may be made equal to the phase-shifted output of feed 16 appearing on such terminal, as indicated by a keen null signal condition thereat in response to an on-boresight target.

The low power output of single feed 16, as further attenuated in traversing coupler 17 to the sum channel output terminal σ', has substantially little effect upon the response thereof to the corporate feed output.

The system aperture for the arrangement of FIG. 7 is determined by the physical arrangement of feeds 10 and 16, while feeds 10 act as a right hand subarray and feed 16 acts as a left hand subarray. However because the right-hand array represents a substantially larger component aperture than feed 16, the respective component far field patterns associated with such apertures will differ substantially. The component far field pattern associated with the larger subarray will be a narrow beamwidth pattern (relative to that associated with the smaller aperture of supa feed 16), the phase of which is 180° on-boresight and rapidly changes with angle off-boresight $\beta$ due to its spatial displacement from the axis of symmetry of the smaller aperture (used for a phase reference). The constituent signals at terminal Δ' of FIG. 7 thus will add in much the same way as described in connection with the description of FIG. 6. However, the on-boresight null will be much narrower due to the fact that the antiphase condition occurs only at boresight rather than over the entire main beam of the larger aperture. Hence, the odd-valued function or monopulse difference channel signal (as a function of angle-off-boresight) for the arrangement of FIG. 7 will display a sidelobe bias level above that of the sum channel signal, as illustrated in FIG. 8.

Figure 8:
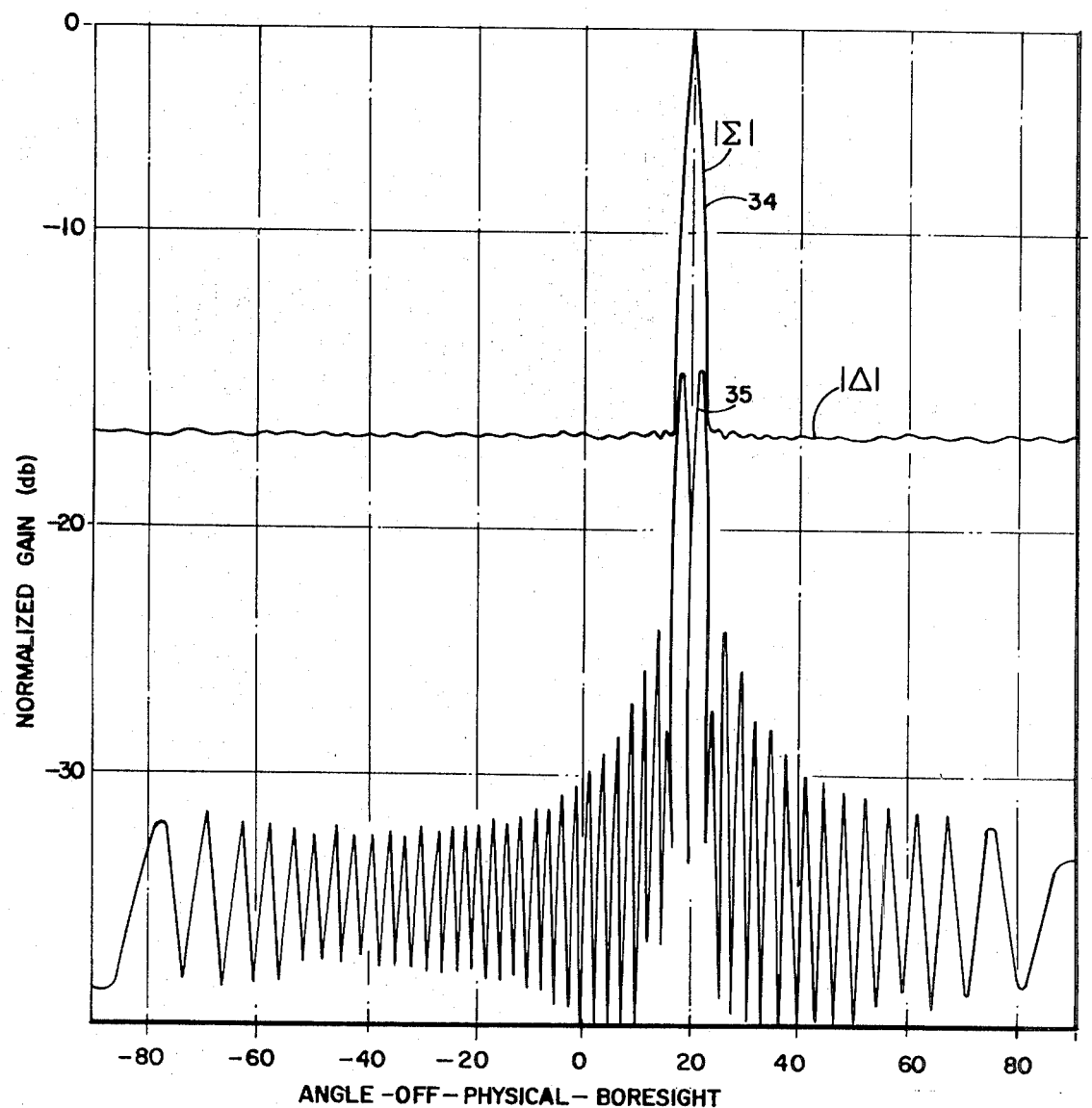
FIG. 8 is an exemplary diagram of representative sum and difference patterns obtained by the device of FIG. 7.

It is also to be noted from FIGS. 4 and 8 that, because of the incorporation of the high level difference signal Δ in FIG. 3, the associated peaks of the monopulse difference channel response (curve 25 of FIG. 4) as normalized by or compared to the sum channel response (curve 24 of FIG. 4) may be substantially higher with the arrangement of FIG. 3, so that increased difference channel sensitivity is obtained. Thus, the embodiment of FIG. 3 is especially useful for accurate monopulse angle measurements, as to be a preferred embodiment for such purposes. HOwever, the embodiment of FIG. 7 may be preferred where simplicity of structure, and associated reduction in manufacturing costs are preferred.

Accordingly, there has been described a technique or method for reducing the monopulse anomalies in a monopulse system, comprising the injection of a signal sample from a small aperture device into a signalling channel of a larger aperture device, said devices having a substantially common boresight direction, whereby monopulse sum and difference patterns are obtained in which the sidelobe response level of the difference pattern is greater than that of the sum pattern.

Although the invention has been described and illustrated in terms of an electrically scanned array, the concept of the invention is not so limited and is equally applicable to a dish type antenna.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a monopulse receiver system having a sum channel and a difference channel and means responsive to said sum and difference channels for determining the angle-off-boresight, beta, of a detected target, the improvement comprising means for avoiding beta anomalies by the injection of an ancillary sum channel received-energy sample into the difference channel, whereby the level of the difference channel sidelobe response to said target is maintained above that of the first mentioned sum channel.

2. The device of claim 1 in which said means for avoiding beta anomalies further includes an auxiliary feedhorn for providing said received energy sample.

3. In an array type microwave antenna having at least two pluralities of feeds oppositely disposed about a boresight axis of said antenna, and coupled to a magic tee for utilization as a monopulse system, the improvement comprising
   an ancillary feed;
   a first microwave directional coupler having a first input port coupled to a sum output of said magic tee and a second input port coupled to said ancillary feed, and further having a third port comprising a system sum port and a fourth port; and
   a second microwave directional coupler having a first port coupled to a difference output port of said magic tee, a second port coupled to said fourth port of said first directional coupler, and an output port comprising a monopulse system difference port.

4. The device of claim 3 in which the aperture of said ancillary feed is substantially less than that provided by said pluralities of feeds.

5. The device of claim 3 in which said directional couplers comprise phase-shifting directional couplers and in which there is further provided compensatory phase-shift means interposed in microwave circuit between said ancillary feed and said second port of said first coupler and between said fourth port of said first coupler and said second port of said second coupler, a fourth port of said second coupler being terminated by a nonreflective terminating impedance.

6. The device of claim 3 in which the aperture of said ancillary feed is substantially less than that provided by said pluralities of feeds and centrally disposed relative thereto.

7. In an array type microwave antenna including at least one plurality of feeds forming a subarray having a selected aperture, the monopulse improvement comprising
   an additional feed in said array and having an aperture substantially less than that of said subarray;
   a microwave directional coupler having a first input port coupled to said subarray and a second input port coupled to said additional feed; and
   a phase-shifter interposed in series circuit between said coupler and one of said subarray and said additional feed, a respective first and second output of said coupler providing a respective sum and difference monopulse output.

8. The device of claim 7 in which the on-boresight gain of said array at said second output of said coupler is adjusted to be equal to the on-boresight gain of said additional feed at said second output of said coupler.

9. The device of claim 7 in which the on-boresight gain of said array at said second output of said coupler is adjusted to be equal to the on-boresight gain in said additional feed at said second output of said coupler, and which phase shifter and said coupler are arranged to provide an antiphase relation between said subarray and said additional feed at said difference monopulse output of said directional coupler.

10. An antenna system, comprising
    a first and second antenna aperture means, said second aperture being substantially less than that of said first aperture; and
    means having a first output port for differentially coupling said first and second apertures, said means for differentially coupling further providing attenuation of said coupling of said first aperture, and further having a second output port providing an output indicative of the monopulse sum of said first and second apertures, said first output port providing a monopulse difference signal.

11. An antenna system, comprising
    a first and second antenna aperture means, said second aperture being substantially less than that of said first aperture; and
    means having a first output port for differentially coupling said first and second apertures, said means for differentially coupling further providing attenuation of said coupling of said first aperture being comprised of a first and second subarray and in which there is further provided
    monopulse signalling means coupled to said first and second subarrays for providing a monopulse sum and difference output, said means for differentially coupling being coupled to said monopulse sum output of said monopulse signalling means; and
    injection signalling means for injecting a differential signal output of said means for differentially coupling into said monopulse difference output.

12. In a monopulse receiver system having a sum channel and a difference channel and means responsive to said sum and difference channels for determining the angle-off-boresight, beta, of a detected target, the improvement comprising means for avoiding beta anomalies by the injection of a received-energy sample into the difference channel, whereby the level of the difference channel sidelobe response to said target is maintained above that of the sum channel; said means for avoiding beta anomalies further including an auxiliary feedhorn disposed at the boresight axis of said system for providing said received energy sample.

13. In a monopulse receiver system having a sum channel and a difference channel and means responsive to said sum and difference channels for determining the angle-off-boresight, beta, of a detected target, the improvement comprising means for avoiding beta anomalies by the injection of a received-energy sample into the difference channel, whereby the level of the difference channel sidelobe response to said target is maintained above that of the sum channel; said means for avoiding beta anomalies further including a feedhorn having an aperture less than that of said system for providing said received energy sample.

* * * * *